March 1, 1927. 1,619,128
C. JOBST
ICE SCORING MACHINE
Filed Dec. 17, 1923 3 Sheets-Sheet 1

INVENTOR.
BY Conrad Jobst
Whittemore, Hulbert, Whittemore & Belknap
ATTORNEYS

March 1, 1927.

C. JOBST 1,619,128

ICE SCORING MACHINE

Filed Dec. 17, 1923  3 Sheets-Sheet 2

INVENTOR.

BY Conrad Jobst

Whittemore, Hulbert, Whittemore, & Belknap
ATTORNEYS

March 1, 1927.  C. JOBST  1,619,128
ICE SCORING MACHINE
Filed Dec. 17, 1923    3 Sheets-Sheet 3

INVENTOR.
Conrad Jobst
Whittemore, Hulbert,
Whittemore, & Belknap
ATTORNEYS

Patented Mar. 1, 1927.

1,619,128

UNITED STATES PATENT OFFICE.

CONRAD JOBST, OF TOLEDO, OHIO, ASSIGNOR, BY MESNE ASSIGNMENTS, TO THE ULINE ICE-SCORING MACHINE COMPANY, OF WILMINGTON, DELAWARE, A CORPORATION OF DELAWARE.

ICE-SCORING MACHINE.

Application filed December 17, 1923. Serial No. 681,259.

This invention relates to machines for scoring ice cakes, such as are delivered from the freezing cans in an artificial ice plant, so as to permit of subsequently dividing said cakes into sections of exactly predetermined size and weight.

The invention consists in the structural features and arrangement of parts hereinafter set forth.

In the drawings:—

Figure 1:
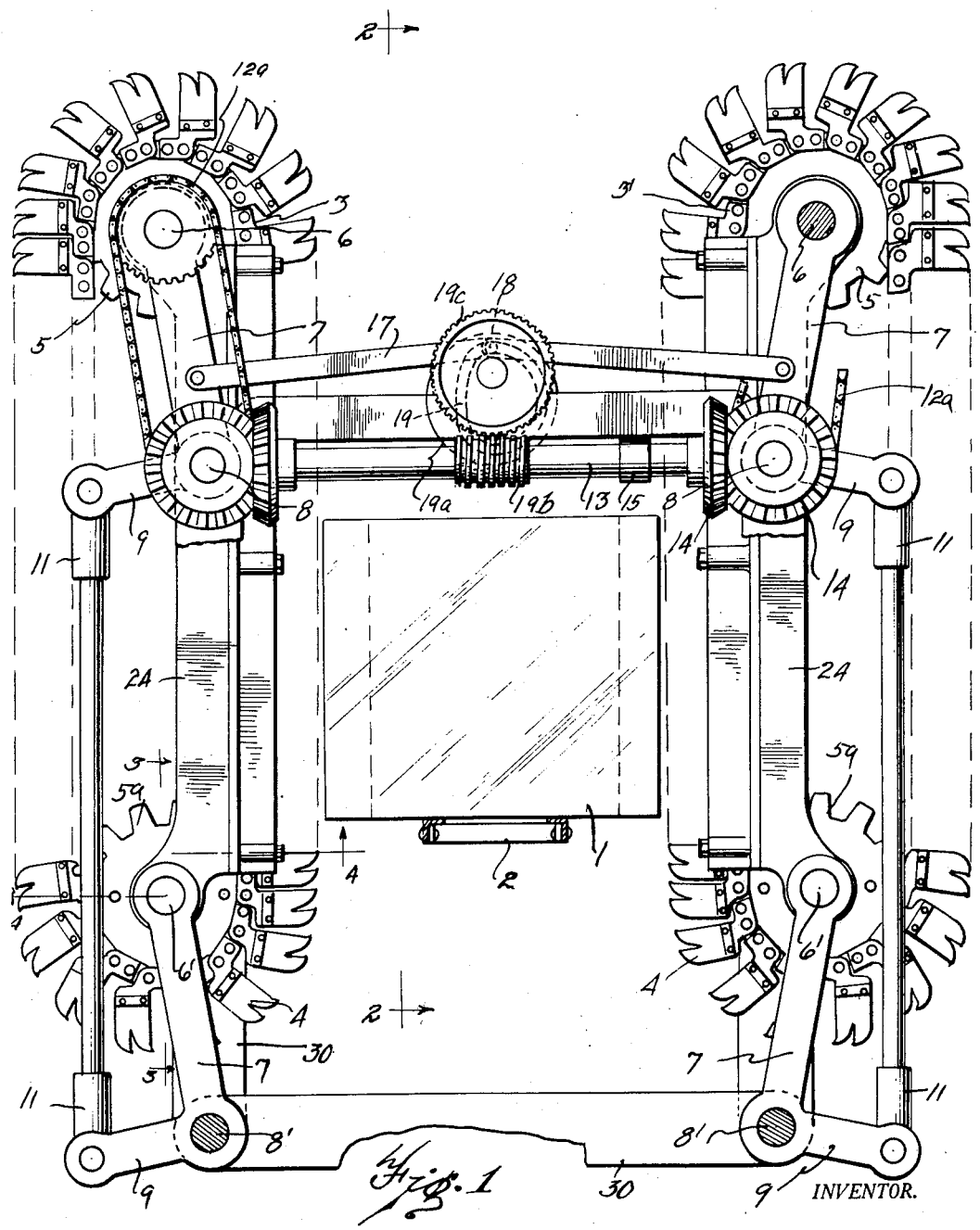
Figure 1 is an end view of the improved machine.
Figure 2:
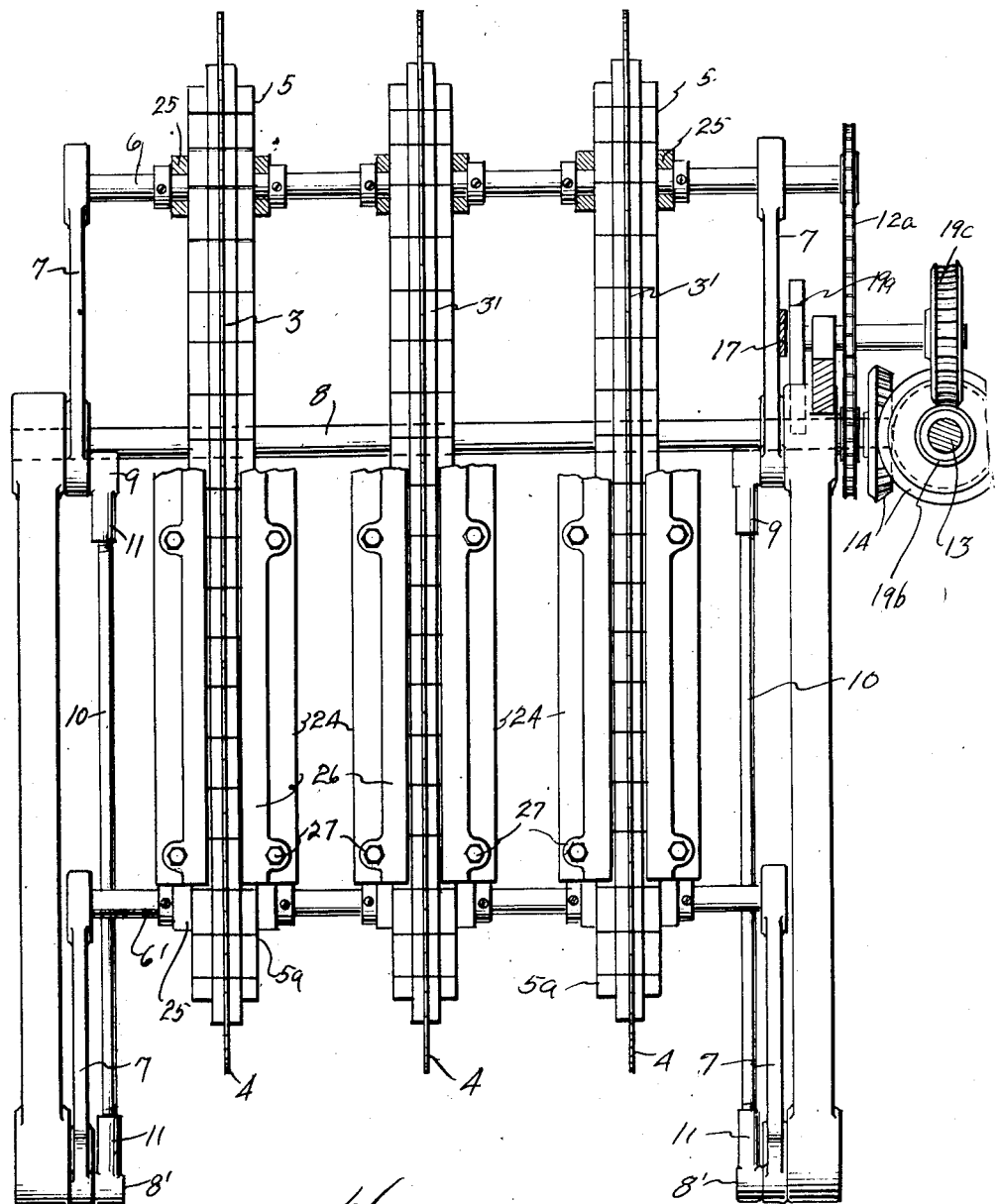
Figure 2 is a transverse section on the line 2—2 of Figure 1.
Figures 3, 4:
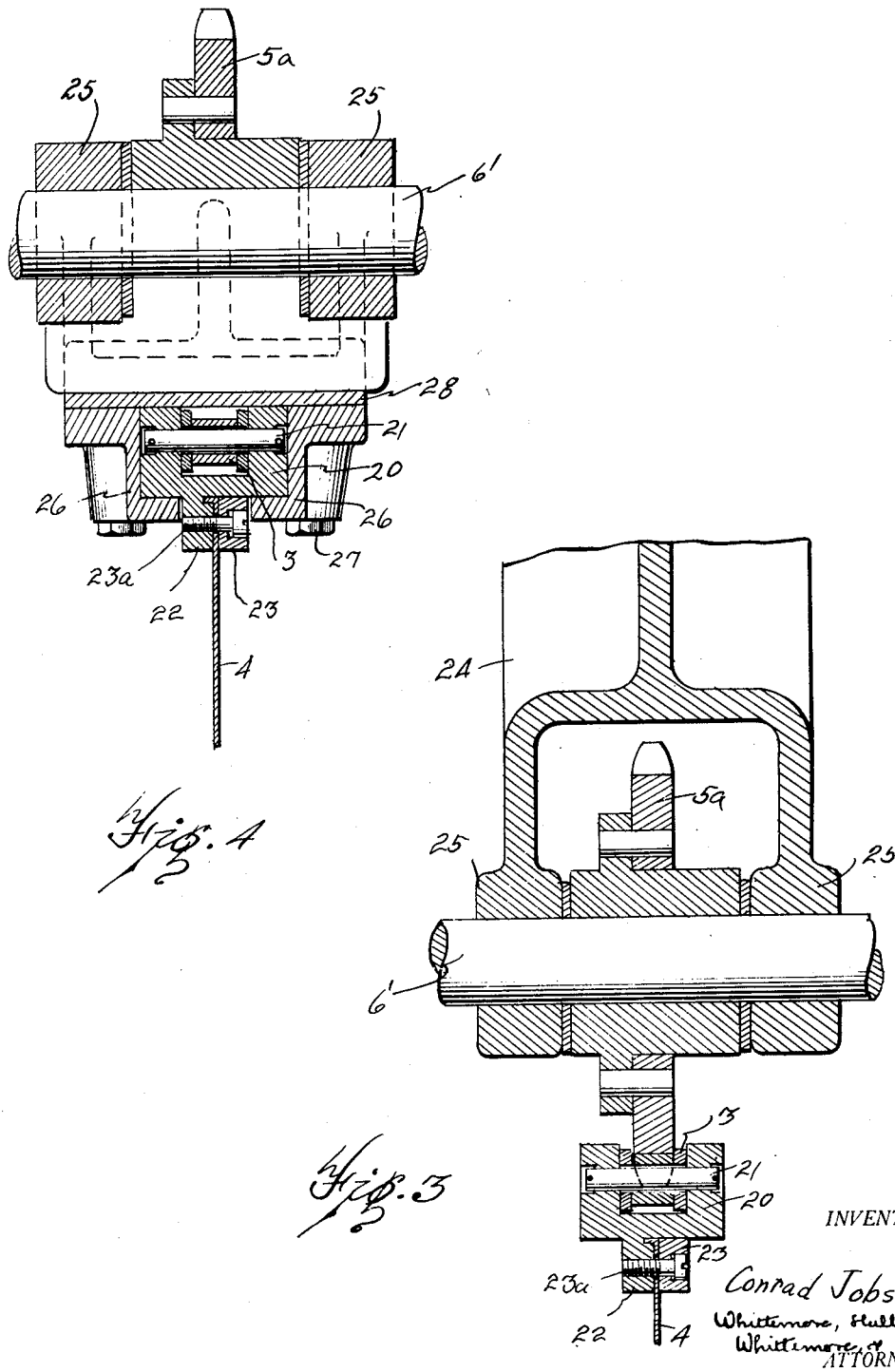
Figure 3 is an enlarged cross section on line 3—3 of Figure 1.
Figure 4 is a cross section on line 4—4 of Figure 1.

In these views, the reference character 1 designates an ice cake and 2 a support upon which said cake rests while being scored by the machine. 3 and 3' designate two sets of endless chains preferably elongated vertically and arranged at opposite sides of the support 2. 4 are scoring elements carried by each of said chains and aligned longitudinally thereof, said elements preferably having the nature of saw teeth. Each of said chains is mounted upon upper and lower sprocket wheels 5 and 5ª which are fast upon upper and lower shafts 6 and 6' journaled in the free ends of rock arms 7 mounted upon upper and lower shafts 8 and 8'. The shafts 8 and 8' are suitably mounted in the frame of the machine indicated generally by the reference character 30. The arms 7, together with relatively short arms 9, form bell crank members, and 10 designates rods connecting the arms 9 of the upper and lower bell crank members. The upper bell crank members 7, 9 are loose upon their shafts 8, and the corresponding lower bell crank members are fast upon their shafts 8'. Preferably the rods 10 are terminally reversely screwed into sleeves 11 pivotally engaging the arms 9, thus providing for an adjustment in the length of the connections between the upper and lower bell crank members. From each shaft 8, a drive connection is established to the adjacent shaft 6 through a chain 12ª. A drive connection to each shaft 6 from a relatively transverse shaft 13 is established through a pair of bevel gears 14. 15 is a drive pulley fast upon the shaft 13. Thus it is seen that the invention provides two substantially duplicate sets of scoring mechanism for acting upon opposite faces of the ice block 1. One of the upper rock arms 7 of each set is connected by a link 17 to a pin 18 midway between said sets which engages in the cam groove 19 of a cam member 19ª. Said member is rotatively driven from the shaft 13 through a worm 19ᵇ and a worm wheel 19ᶜ. Said cam is adapted to subject the pin 18 to a slight vertical travel which acts through the links 17 to alternately swing the rock arms 7 to and from each other. Thus the two sets of chains 3 and 3' are alternately shifted to and from each other to feed the saw teeth 4 into opposite side faces of the ice cake 1 and during such feeding movement said chains are continuously driven through the chains 12ª. To mount the saw teeth 4 upon the chains 3 and 3' there are employed carriers 20 secured to the links of said chains by the pins 21 which connect said links. The carriers 20 are of a channel shape to embrace the chain links 3 and 3' and each has formed upon its outer face the integral clamping member 22. With each of the latter there coacts a detachable clamp 23, the base portion of each double saw tooth 4 being engaged between a pair of the members 22 and 23, which are clamped upon said tooth by screws 23ª.

With each of the chains 4 there is associated a guide bar 24, the upper and lower ends of which are pivoted respectively upon the shafts 6 and 6'. Preferably said bars are terminally forked to form bearings 25 engaging said shafts 6 and 6' at opposite sides of the sprocket wheels 5 and 5ª. Each guide bar 24 carries a pair of Z-shaped bars 26 spaced to form a channel through which the working span of the corresponding chain 3 or 3', with its carrier members 20, may travel. 27 are bolts securing the channel elements 26 to the main guide bars 24, and 28 is a wear plate clamped between said channel elements and each guide bar 24, the carrier members 20 having contact with said plate 28 when traveling between the channel elements 26 and said plate receiving the reaction thrust to which the working span of each chain is subjected during scoring of an ice block.

In the operation of the described construction; the pulley 15 being continuously driven imparts continuous rotation through the shaft 13 and bevel gearing 14 to the shafts 8 and the latter act through the chains 12ª to continuously drive the shafts 6. Thus the two sets of chains 4 are continuously driven, the adjacent or working spans of said chains moving upwardly as indicated by the arrows in Figure 1. The shaft 13 also acts through the worm 19ᵇ and worm wheel 19ᶜ to continuously drive the cam 19ª, which latter acting through the links 17, periodically swings the work arms 7 of the two sets to and from each other. This rocking movement is of a magnitude predetermined to feed the saw teeth 4 into the block 1 to produce kerfs or scores of the desired depth. The shape of the cam groove 19 is such as to cause a gradual feeding of the saw teeth 4 into the ice block 1 and a relatively quick retractive travel, said groove further providing for a stationary period of the two sets of arms 7 during which a scored block may be removed from the support 2 and another block be placed thereupon. The guide members 24, 26, engaging the working or upwardly traveling spans of the chains 3 and 3', being mounted upon the shafts 6 and 6', move to and from the ice block 1 in unison with said chains. By engaging said chains, and more particularly the carrier members 20 with said guide members, the saw teeth 4 are held in perfect longitudinal alignment during the scoring operation and furthermore the reaction thrust of the work upon said chains and carrier members is rigidly resisted by the guide member 24. The plates 28 receive the wear resulting from said reaction thrust and said plates may be replaced when the wear thereupon is excessive.

It is to be understood that the chains of each set 3 and 3' may be so spaced as to effect cutting of the block 1 into sections of the desired predetermined size or sizes.

What I claim as my invention is:—

1. An ice scoring machine comprising endless scoring elements arranged to engage opposite sides of an ice block and means for simultaneously moving said scoring elements parallel with the sides of the block and means for feeding the scoring elements toward each other into the block.

2. An ice scoring machine comprising endless scoring elements arranged to engage opposite sides of an ice block, means for continuously moving said scoring elements through rectilinear paths, each substantially parallel with a side of the block and means for feeding said scoring elements transverse to said rectilinear paths and toward each other into the block.

3. An ice scoring machine comprising a support for an ice block, elongated flexible members arranged at opposite sides of said support, a series of ice scoring elements carried by each of said members aligned longitudinally of the latter, means for moving said flexible members bodily toward each other to oppositely engage said scoring elements with an ice block on said support, and means for continuously driving said flexible members during such feeding movement.

4. An ice scoring machine comprising a support for an ice block, elongated flexible members at opposite sides of said support, a series of ice scoring elements carried by each of said members and alinged longitudinally thereof, spaced rock arms mounting each of said flexible members, means for rocking said arms in unison for bodily actuating said flexible members toward each other and simultaneously engaging said scoring elements with opposite sides of a block on said support, and a common means for actuating said flexible members longitudinally during such feeding movement.

5. An ice scoring machine comprising a support for an ice block, elongated flexible members arranged at opposite sides of said support, a series of ice scoring elements carried by each of said members and aligned longitudinally thereof, rotatable supports for said flexible members, spaced rock arms mounting the rotatable supports of each flexible member, a cam member acting upon a supporting rock arm of each of said flexible members to periodically rock said members toward each other, and a common means for continuously driving said flexible members during such rocking movement.

6. An ice scoring machine comprising a support for an ice cake, a series of elongated flexible members arranged on opposite sides of said support, ice scoring elements carried by each of said flexible members, means for longitudinally actuating said flexible members, a guide for said scoring elements of each flexible member and means for simultaneously moving the guide member of each series of flexible members toward the other series in a direction transverse to the elongation of said flexible members.

7. An ice scoring machine comprising a horizontal support for an ice cake, a pair of elongated endless cutters arranged vertically on opposite sides of said support, said cutters each passing through a rectilinear path, means for continuously moving said cutters and means for bodily moving the cutters toward each other simultaneously scoring opposite sides of the ice cake.

8. An ice scoring machine comprising a stationary frame, a support for an ice block, a pair of rock arms of equal length pivoted on said frame, rotatable members journaled on each rock arm, an endless flexible member extending around said rotatable members, ice scoring elements carried by said flexible member, a guide for said flexible member extending between said rock arms and having a rectilinear portion opposite the ice cake and means for synchronously oscillating said rock arms through a predetermined distance whereby said ice scoring elements are fed into the ice cake a limited distance forming a kerf of uniform depth.

9. An ice scoring machine comprising a stationary frame, a support for an ice block, a pair of rock arms pivoted on said frame, rotatable members journaled on each rock arm, an endless flexible member extending around said rotatable members, ice scoring elements carried by said flexible member, a guide for said flexible member extending between said rock arms and having a rectilinear portion opposite the ice cake, a rod connecting said rock arms, a cam follower connected to one of said rock arms and a continuously rotating cam engaging said cam follower, said cam being adapted to feed the ice scoring elements into said ice cake for a predetermined distance and subsequently to retract said elements.

In testimony whereof I affix my signature.

CONRAD JOBST.